United States Patent
Kurashima et al.

(10) Patent No.: US 6,863,451 B2
(45) Date of Patent: Mar. 8, 2005

(54) OPTICAL MODULE

(75) Inventors: Hiromi Kurashima, Yokohama (JP); Kazushige Oki, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 29 days.

(21) Appl. No.: 10/445,810

(22) Filed: May 28, 2003

(65) Prior Publication Data

US 2003/0223708 A1 Dec. 4, 2003

(30) Foreign Application Priority Data

May 29, 2002 (JP) ........................................ 2002-156344

(51) Int. Cl.[7] ................................................ G02B 6/36
(52) U.S. Cl. ............................ 385/92; 385/88; 385/89; 385/94
(58) Field of Search .............................. 385/88–94, 49

(56) References Cited

U.S. PATENT DOCUMENTS

| | | | | |
|---|---|---|---|---|
| 5,361,318 A | * | 11/1994 | Go et al. ...................... | 385/89 |
| 5,719,979 A | * | 2/1998 | Furuyama .................... | 385/89 |
| 6,074,228 A | | 6/2000 | Berg et al. | |
| 6,226,424 B1 | | 5/2001 | Ball et al. | |
| 6,302,596 B1 | | 10/2001 | Cohen et al. | |
| 6,483,960 B2 | * | 11/2002 | Schroedinger ............... | 385/14 |
| 2002/0154362 A1 | | 10/2002 | Oki et al. | |
| 2003/0063397 A1 | | 4/2003 | Inujima et al. | |
| 2003/0063424 A1 | | 4/2003 | Inujima et al. | |

FOREIGN PATENT DOCUMENTS

EP          0-660-454 A2    6/1995

* cited by examiner

Primary Examiner—Hemang Sanghavi
(74) Attorney, Agent, or Firm—McDermott Will & Emery LLP

(57) ABSTRACT

This invention provides an optical module with a hot-pluggable configuration in which a mechanical stress induced by the difference of the thermal co-efficient of the wiring substrate and the housing of the module, whereby the reliability of the module is enhanced. The optical module of the invention comprises tow optical sub-assemblies 12, 14, a wiring substrate 18, a housing 20, and holder 22. The housing includes a front space in which the sub-assemblies are enclosed and a rear space enclosing the wiring substrate. The holder has a resilient portion for pressing the wiring substrate against the rear space of the housing. A stopper is provided on the partition wall between the front space and the rear space of the housing, to which the wiring substrate is pressed.

15 Claims, 6 Drawing Sheets

OPTICAL MODULE

BACKGROUND OF THE INVENTION

1. Field of the Invention

This invention relates to an optical link module, by which an optical signal is transmitted and/or received.

2. Related Prior Art

An optical link module has an optical transmitting sub-assembly (TOSA) that converts an electrical signal to an optical signal, and an optical receiving sub-assembly (ROSA) that converts the optical signal to the electrical signal. These TOSA and ROSA are enclosed within a housing so as connected to a wiring substrate. Such optical link module has been disclosed in the U.S. Pat. No. 6,074,228.

The TOSA, the ROSA and the wiring substrate are arranged and fixed within the housing. In the link module with a pluggable function, the accurate position of the wiring substrate is required to connect the board with external terminals. When the wiring substrate is rigidly fixed within the housing to secure the positional accuracy, a residual stress due to a difference of the thermal expansion coefficient of assemblies is accumulated in the portion where the TOSA and the ROSA are fixed to the wiring substrate, which causes a deformation and a deterioration of a reliability of the module.

SUMMARY OF THE INVENTION

The present invention is to solve the problem that the residual stress is accumulated in the connection portion of the TOSA/ROSA to the wiring substrate, thereby enhancing the operational stability.

An optical module according to the present invention comprises an optical sub-assembly, a wiring substrate, a housing having a front space, a rear space and a stopper provided between the front space and the rear space, and a holder for holding the wiring substrate. The wiring substrate mounts electrical parts thereon and is electrically connected to the optical sub-assembly. The front space of the housing encloses the optical sub-assembly and the rear space thereof encloses the wiring substrate. The front space, the stopper and the rear space are arranged along a hypothetical axis in this order. The holder has a resilient portion for pressing the substrate toward the front space so as to butt the wiring substrate against the stopper.

In the present optical module, the wiring substrate is held by holder and pressed against the stopper of the housing by the resilient portion of the holder. Therefore, the position of the wiring substrate along the hypothetical axis is accurately decided without firmly fixing the substrate to the housing. This configuration enables to compensate the difference of the thermal expansion between the wiring substrate and the housing, which prevents the accumulation of the residual stress and enhances the reliability of the module.

The wiring substrate of the present invention preferably has a first portion with a first width, a second portion with a second width greater than the first width, and a taper provided between the first portion and the second portion. The holder preferably comprises a base with an opening through which the first portion of the wiring substrate is inserted, and the resilient portion disposed so as to sandwich the opening. These configuration of the wiring substrate and the holder enables to hold the wiring substrate by inserting the first portion thereof through the opening and to position the wiring substrate without firmly fixing to the housing by pressing it toward the front space along the hypothetical axis.

In the present invention, the holder preferably comprises latches and the housing preferably comprises a pair of side wall having a latch for hooking the latch of the holder. By hooking mechanism between latches, the wiring substrate can be fixed to the housing.

In the optical module according to the present invention, the side wall preferably has a groove extending along the hypothetical axis for guiding the wiring substrate. This groove makes it simple to enclose the wiring substrate into the housing by guiding the substrate along the groove. Further, the groove preferably has at least a pair of inner wall and an elastic piece for pressing the wiring substrate against one of the inner wall of the groove. This configuration may position the wiring substrate along a direction normal to the hypothetical axis without firmly fixing to the housing.

In the optical module according to the present invention, the optical sub-assembly preferably comprises a first portion having a first diameter, a second portion having a second diameter smaller than the first diameter, and a step for connecting the first portion to the second portion. Further, the housing preferably has an optical receptacle next to the front space along the hypothetical axis and a partition with a hole piercing from the front space to the optical receptacle. The optical sub-assembly is preferably arranged so that the second portion thereof is inserted in the hole and the step butts against the partition. This configuration enables to position the sub-assembly along the hypothetical axis.

In the optical module according to the present invention, the optical sub-assembly preferably has a plurality of lead terminals for electrically connecting the sub-assembly to the wiring substrate. The lead terminals preferably sandwich the wiring substrate and have a resilient characteristic. This configuration enhances not only the productivity of the module but also the reliability of the module.

In the optical module according to the present invention, the optical sub-assembly may be a transmitting optical sub-assembly (TOSA) or a receiving optical sub-assembly (ROSA). Further, the optical module of the present invention can contain the TOSA and the ROSA.

DETAILED DESCRIPTION OF THE EMBODIMENT

Figure 1:
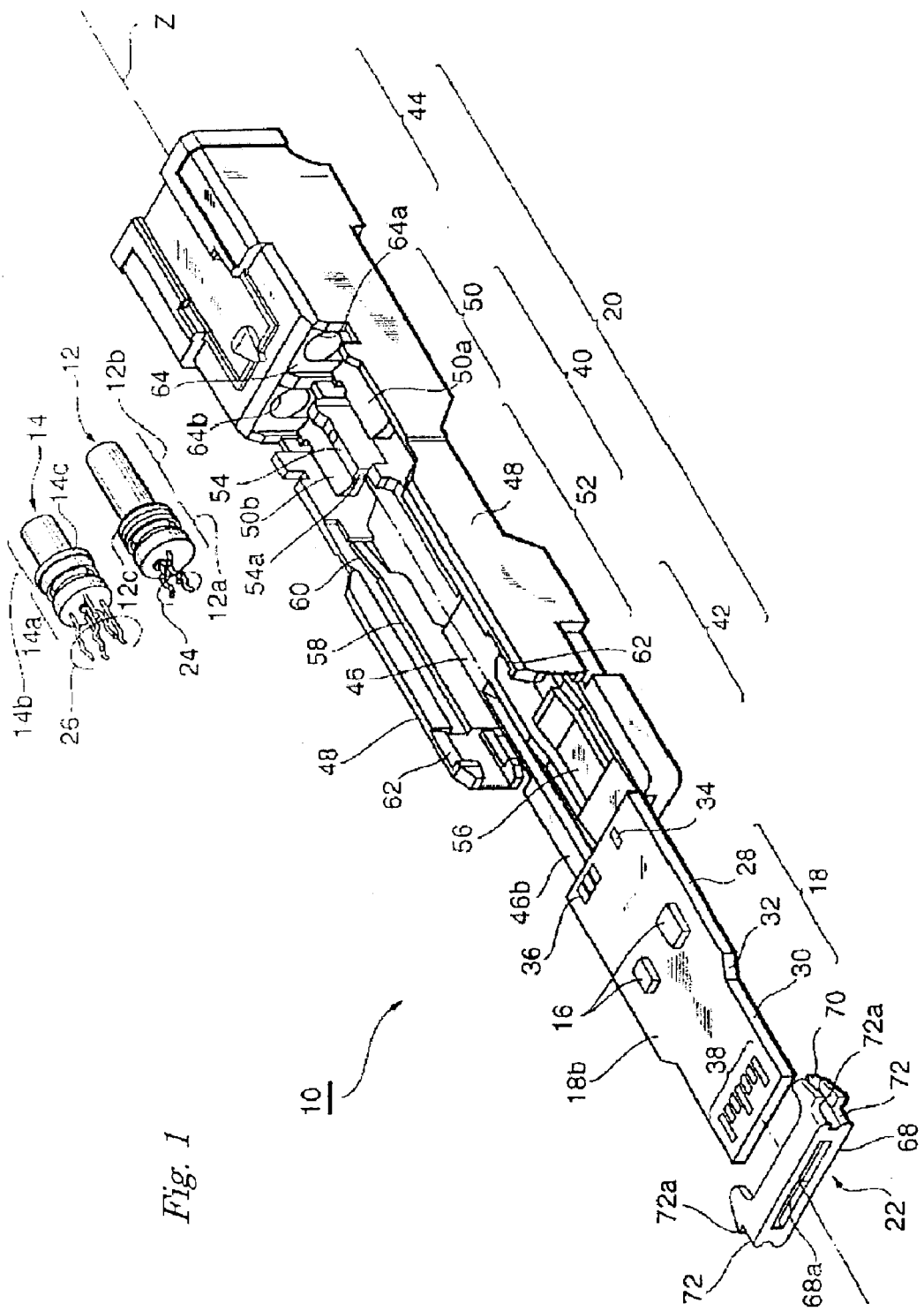
FIG. 1 is an exploded view illustrating the optical module of the present invention.
Figure 2:
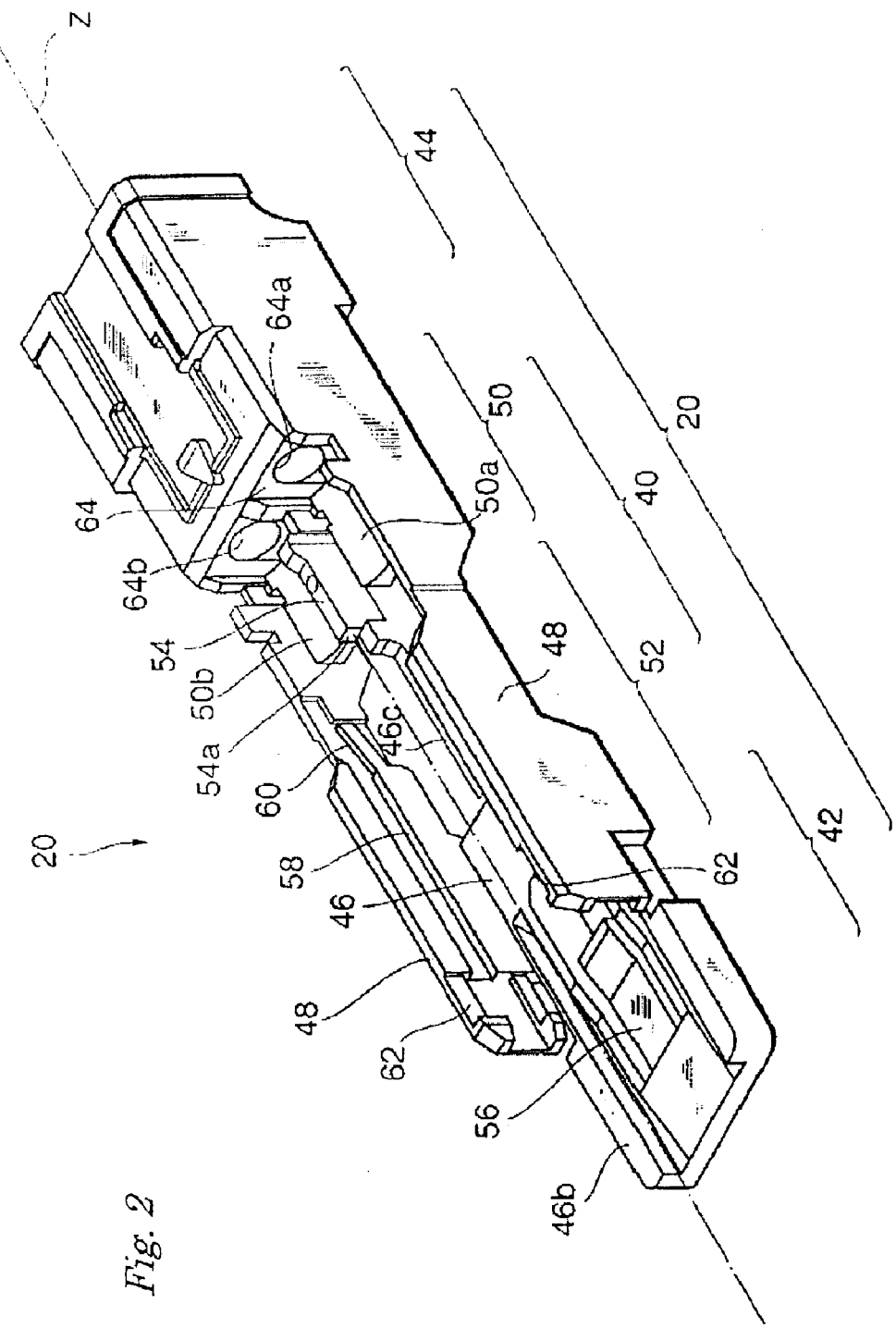
FIG. 2 is a bottom perspective view of the optical module.

The preferred embodiments of the present invention will be described. In the drawings, Elements identical to each other will be referred to with numerals identical to each other without overlapping explanations.

FIG. 1 is a perspective view from the bottom side of an optical link module 10 according to the present embodiment. The link module 10 has a transmitting optical sub-assembly (TOSA) 12, a receiving optical sub-assembly (ROSA) 14, a wiring substrate on which a plural electrical parts are mounted, a holder 22 for securing the wiring substrate, and a housing 20 for enclosing the TOSA, the ROSA and the wiring substrate therein.

The transmitting optical sub-assembly 12 comprises a first portion 12a with a tubular shape for enclosing a light-emitting device, such as a laser diode, and a second portion 12b with a tubular shape. The second portion 12b contains a ferrule through which a tip of an optical fiber is inserted and a sleeve for holding the ferrule. An outer diameter of the first portion is greater than that of the second portion, whereby a step 12c is formed at the boundary between two portions. Three lead terminals 24 are extended from the first portion. These lead terminals correspond to a signal with a normal phase, a signal with a reverse phase, and a signal of an optical monitor.

The receiving optical sub-assembly 14 comprises a first portion 14a with a tubular shape for enclosing a light-receiving device, such as a photo diode, and a second portion 14b with a tubular shape. Similarly to the TOSA, the second portion 14b contains a ferrule through which a tip of an optical fiber is inserted and a sleeve for holding the ferrule. An outer diameter of the first portion 14a is greater than that of the second portion 14b, whereby a step 14c forms the boundary between two portions. Five lead terminals 26 are extended from the first portion of the ROSA. These lead terminals correspond to a signal with a normal phase, a signal with a reverse phase, a bias supply for the photo diode, a power supply and a ground, respectively.

The wiring substrate 18 is a printed-circuit board made of multi-layered resin material and has a substantially rectangular shape. Portions of both sides are cut, thereby forming a first portion 28 with a first width, a second portion 30 with a second width narrower than the first width, and taper 32 therebetween. Some electrical parts 16, such as an IC for driving the light-emitting device in the TOSA 12 and another IC for processing signals received by the light-receiving device in the ROSA 14, are mounted on the both surfaces of the wiring substrate.

A region near the front edge of the wiring substrate provides a terminal 34 for the TOSA 12 and plural terminals 36 for the ROSA, similarly, the front surface of the wiring substrate provides plural terminals for the TOSA 12 and also for the ROSA 14. These terminals provided in the front edge of the front surface are not shown in FIG. 1.

Figure 6:
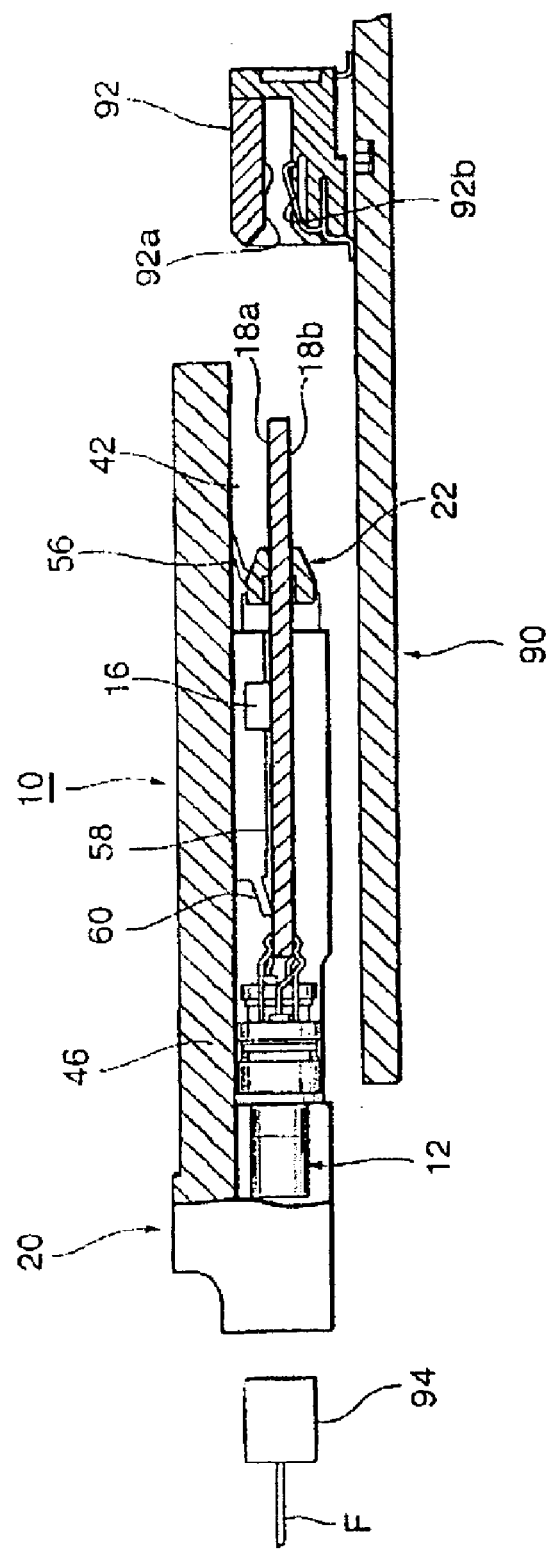
FIG. 6 illustrates a configuration when the optical module is installed on an external board containing a host connector.

A rear edge of both surfaces of the wiring substrate provides plural terminals 38 for contacting to an electrical connector 92 shown in FIG. 6. These terminals correspond ground terminals, power supply terminals, and signal terminals.

The housing 20 comprises a body 40, a connector cover 42 for covering the electrical connector 92 in FIG. 6, and an optical receptacle 44 for receiving an optical connector. The body 40, the connector cover 42 and the receptacle 44 are arranged along the hypothetical Z-axis.

The body 40 has an upper wall 46 and a pair of side walls 48. These walls are arranged along the Z-direction and forms a space surrounded therewith. The front space 50 encloses the TOSA 12 and the ROSA 14 therein, while the rear space 52 sets the wiring substrate 18. The front space 50 comprises of a TOSA mounting space 50a and a ROSA mounting space 50b by a partition 54 extending along the Z-direction. The stopper 54a, which butts against the wiring substrate 28 and prevents the substrate 28 from shaking, is provided at the end of the partition.

Figure 3:
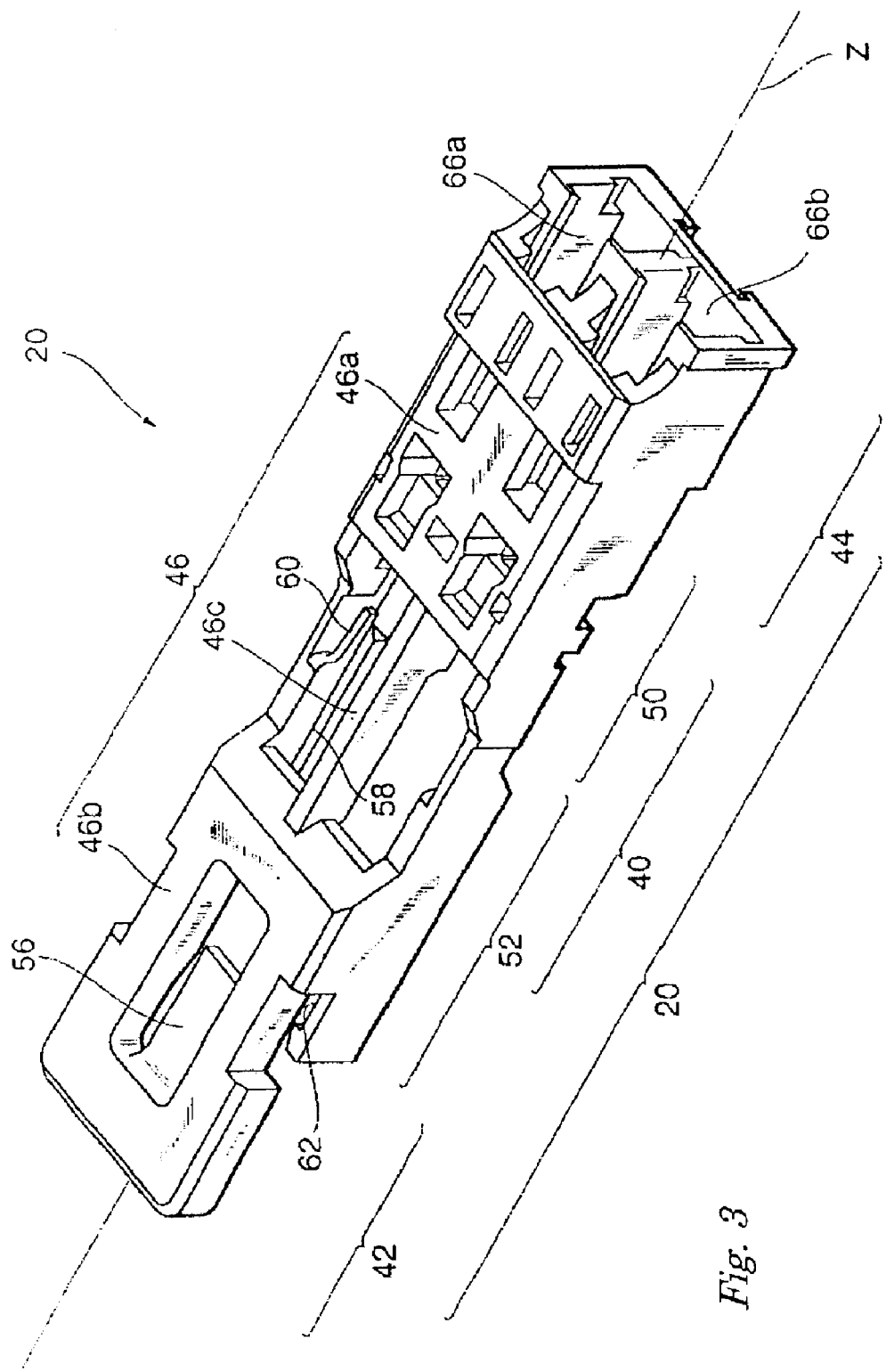
FIG. 3 is an upper perspective view of the optical module.

As shown in FIG. 3, the upper wall 46 of the body 40 comprises a front wall 46a, a rear wall 46b and a rib 46c connecting the front wall 46a to the real wall 46b. The front wall 46a configures the front space 50, and the inner surface thereof supports the TOSA and the ROSA. On the other hand, the rear wall 46b configures the rear space 52 and connects to the connector cover 42. An opening is formed in the center of the rear wall 46b, within which an elastic sheet 56 is attached and held by the rear edge of the opening.

A groove 58 for guiding the wiring substrate 18 is formed in the inner surface of the side wall 48. The front edge of the groove 58 provides an elastic piece 60, which is capable to bend up and down as the wiring substrate 18 is inserted in the groove. Further, a latch 62 is formed in the inner surface close to the rear edge of the side wall 48 to hold the holder 22. The respective grooves have at least a pair of inner surface, one of which is pressed against the wiring substrate.

The optical receptacle 44 is separated from the front space 50 by the partition wall 64 orthogonal to the Z-direction. The receptacle has a pair of openings 66a, 66b for mating an optical connector 94 provided in the tip of the optical fiber as illustrated in FIG. 6. The pair of openings 66a, 66b corresponds to the TOSA mounting space and the ROSA mounting space, respectively. The opening 66a is connected to the TOSA mounting space 50a by a hole 64a provided in the partition wall, while the opening 66b is connected to the ROSA mounting space 50b by a hole 64b.

The holder 22 includes a base portion 68, a resilient portion 70 and a side portion 72. The base portion has an opening 68a through which the second portion of the wiring substrate 18 is inserted. The resilient portion 70 builds up from the base portion and surrounds the opening. The side portion builds up from the resilient portion 70 and has a latch 72a in an outer surface thereof. The holder 22 is hooked to the housing 20 by the latch 72a with the other latch 62 provided in the inner surface of the side wall 48. The hooking mechanism of the holder 22 to the housing 20 is performed by the pair of latch formed in the respective inner surface of the side wall and the corresponding latch provided in the holder 22.

Figure 4A:
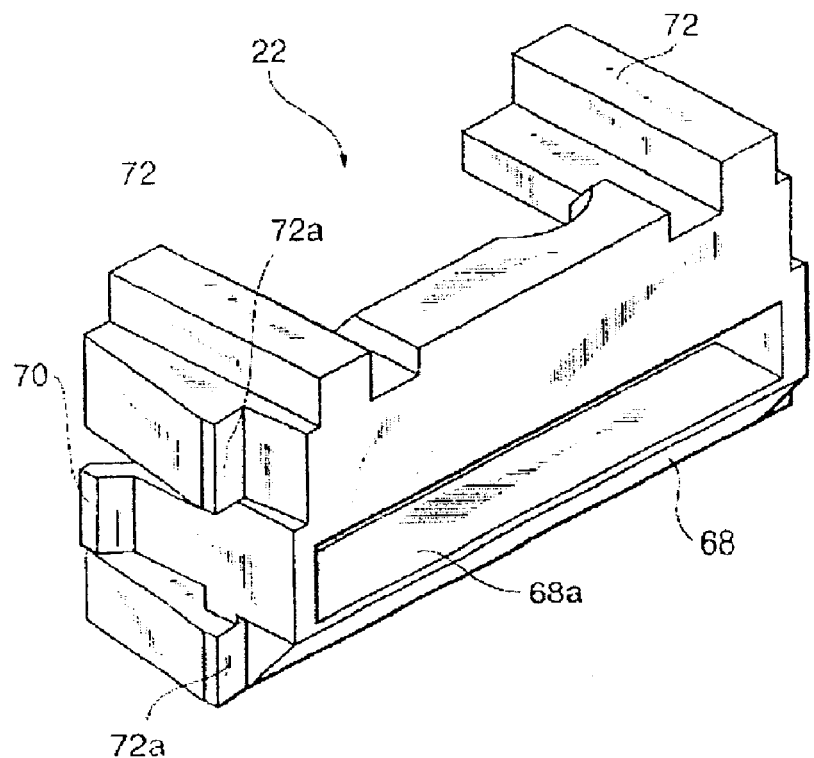
FIG. 4A and FIG. 4B show a configuration of the holder.
Figure 4B:
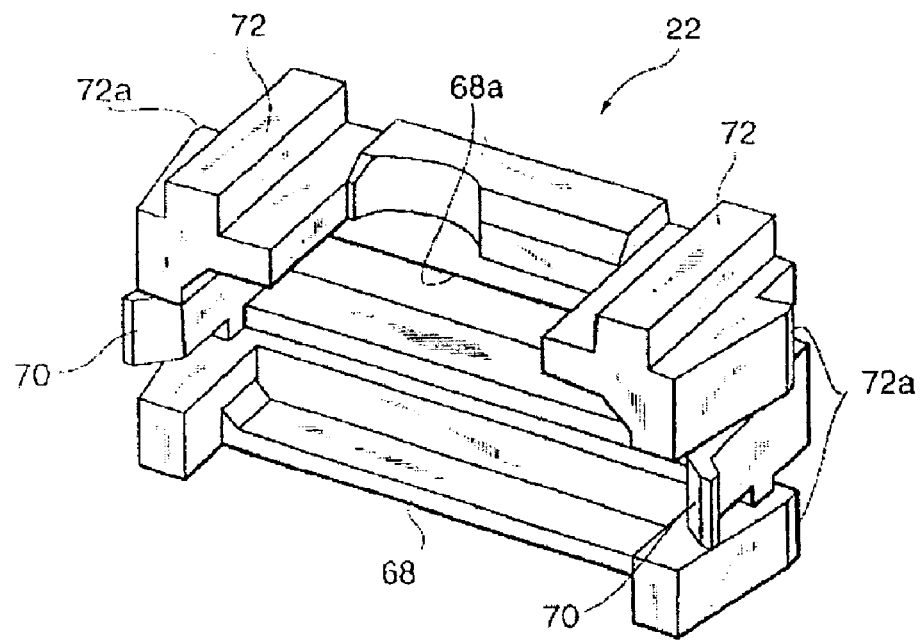
Figure 5:
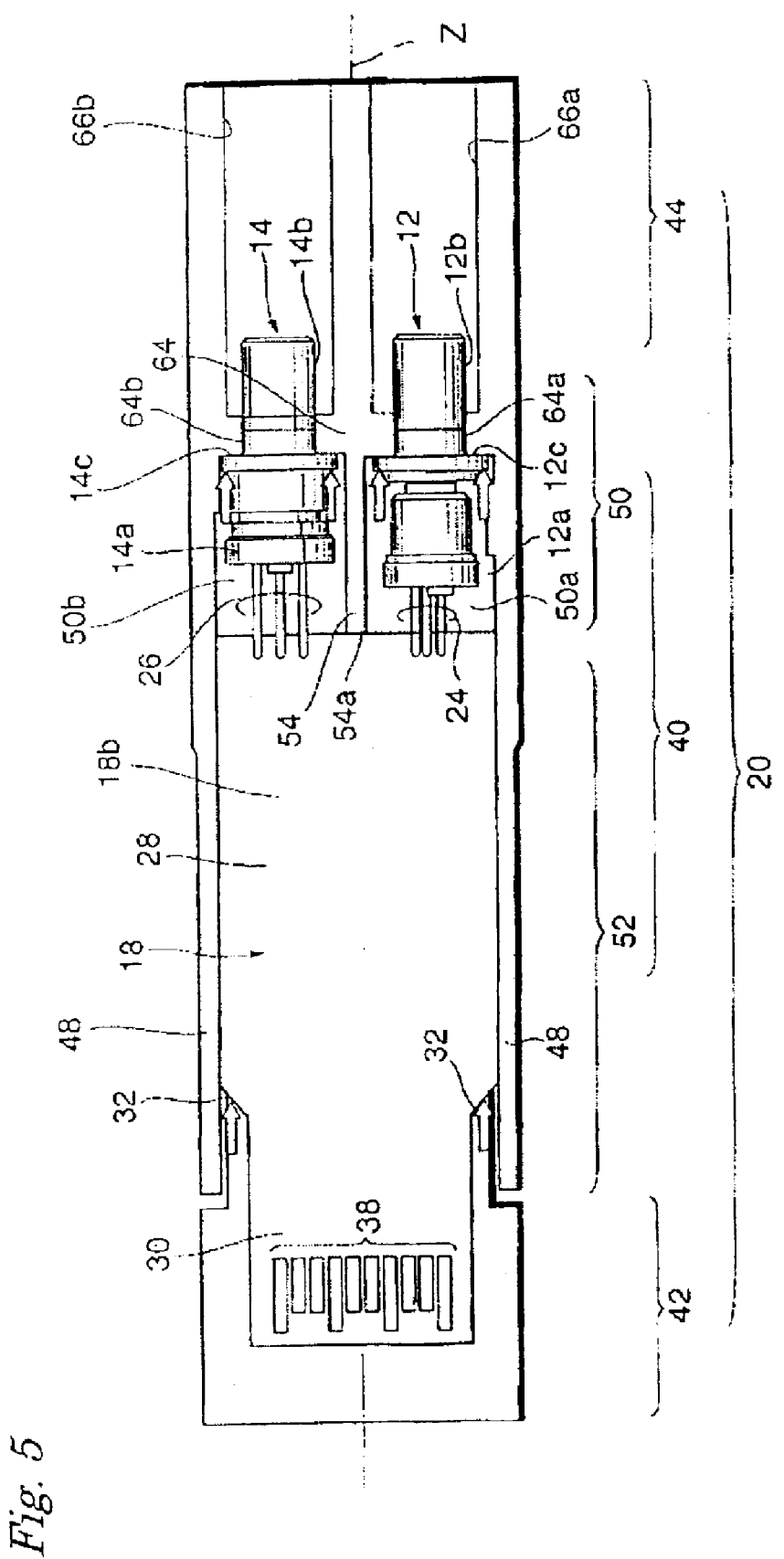
FIG. 5 illustrates the position of the respective elements comprising the optical module.

The TOSA 12 is placed in the TOSA mounting space 52a as the second portion thereof is inserted into the hole 64a provided in the partition 64 as shown in FIG. 4. The position of the TOSA 12 along the z-direction is decided by the configuration that the step 12c of the TOSA butts against the partition 64. Similarly, the ROSA 14 is placed in the ROSA mounting space 52b in the housing 20 as the second portion thereof is inserted into the hole 64b. The position of the ROSA 14 along the z-direction is decided by the configuration that the step 14c of the ROSA 14 butts against the partition 64.

The wiring substrate 18 is enclosed in the rear space 52 of the housing 22. The substrate, which is guided from the side of the connector cover 42 and toward the front edge thereof by the pair of the groove 58 in the side wall 48, butts against the stopper 54a of the partition 54. The wiring substrate 18 is secured by the holder 22 as the second portion 30 thereof with relatively narrower width is inserted into the opening 68a and the taper 32 is pressed against the resilient portion 70 of the holder 22. The latch 72a provided in the both side of the holder 22 are hooked with the corresponding latch 62 provided in the inner surface of the side wall 48 of the housing. The wiring substrate 18 is pressed downward by the elastic piece 60, while the front edge thereof butt against the stopper 54a of the partition 54, whereby the position of the substrate 18 along the z-direction is defined. Moreover, the wiring substrate is pressed downward by the elastic sheet 56 provided in the rear wall 46 and the pair of the elastic piece 60 respectively provided in the front edge of the groove 58, whereby the substrate 18 is pressed against the one of the inner surface of the groove 48, as shown in FIG. 6.

The TOSA 12 is arranged as three lead terminals 24 thereof sandwiches the wiring substrate 18 from the both surfaces, and the ROSA 14 is arranged as five lead terminals 26 thereof sandwiches the substrate 18. These lead terminals 24, 26 are fixed to respective terminals 34, 36 on the wiring substrate 18. The lead terminals 24, 26 preferably has a resilient characteristic to contact firmly to the terminals 34, 36, thereby enhancing the productivity of the module.

Since the wiring substrate 18 is secured under the upper wall 46 with a room thereto, as illustrated in FIG. 6, it is able to install electrical parts in both surfaces thereof which realizes the high density assembly. The rear edge of the wiring substrate 18 projects from the rear space 52 and extends to the connector cover 42.

This optical link module is installed in the external board 90 where the host connector 92 is provided. The host connector 92 has a receptacle 92a for mating with the wiring substrate 18. Within the receptacle 92 of the host connector, plural lead terminals 92b are provided for electrically connecting to the terminals 38 on the wiring substrate 18. When the link module 10 is installed in the external board 90, the host connector 92 is enclosed with the connector cover 42 of the housing 20 and the receptacle 92a thereof mates with the rear edge of the wiring substrate 18. This makes electrical contact between the terminals 38 on the substrate 18 and the corresponding lead terminals 92b within the receptacle 92a. When the link module 10 is to be released, the rear edge of the wiring substrate is pulled out from the receptacle 92a. Thus, the optical link module 10 according to the present embodiment has terminals to be electrically connected to the lead terminals 92b of the host connector in the rear edge portion of the wiring substrate, thus realizing a hot-pluggable arrangement.

The optical link module 10 according to the present invention, the holder 22 secures the wiring substrate 18 as the second portion 30 thereof with a relatively narrower width is inserted into the opening 68a of the holder 22 that is arranged by latching mechanism provided between the holder 22 and the housing 20. The taper 32 of the wiring substrate 18 is pressed against the resilient portion 70 of the holder. The elastic force of the resilient portion 70 presses forward the wiring substrate 18, whereby the front edge of the board 18 butt against the stopper 54a of the partition 54. Therefore, the holder 22 accurately places the wiring substrate 18 within the housing 20 without firmly fixing thereto, which relaxes the difference of the thermal expansion co-efficient between the board 18 and the housing 20. In general, the thermal expansion co-efficient of the resin material that comprises of the housing 20 is about 20 ppm/° C., while that of the wiring substrate is about 10 ppm/° C. By deforming the resilient portion 70 of the holder that presses the taper 32 of the wiring substrate along the z-direction, the difference of the thermal expansion between the parts are compensated. This configuration enables to release residual stress accumulated in the coupling portion of the substrate 18 to the lead terminals 24,26, to maintain the stable operation, and to enhance the reliability of the module 10.

The link module 10 of the present embodiment has the groove 58 extending along the z-direction in the inner surface of both side walls 48. This enables to guide the wiring substrate 18 into the housing 20 by sliding the substrate 18 within the groove 58. Further, the module 10 has the elastic piece 60 and the elastic sheet 56 that press the wiring substrate downward. This enables to enhance the accuracy of the position of the board 18 in a direction normal to the Z-direction.

The positions of the TOSA 12 and the ROSA of the present embodiment are defined by the arrangement that the second portions 12b, 14b thereof are inserted into the holes 64a, 64b provided in the partition 64 and the respective steps 12c, 14c are butt to the partition. Further, by closing the first portions of the TOSA and the ROSA to the rear edge of the partition 54, the length of the lead terminals can be shorten, which decreases the parasitic inductance inherently provided in the lead terminal, thereby enhancing the high frequency performance of the module 10. In the module of the present embodiment, the TOSA and the ROSA are contacted to the wiring substrate 18 as the plural lead terminals 24, 26 sandwich the wiring substrate 18, which enables to enhance the productivity of the module 10.

From the invention thus described, it will be obvious that the invention and its application may be varied in many ways. For example, the embodiment described above has both the TOSA and the ROSA. However, the present invention may be applicable for the module having only the TOSA or the ROSA.

What is claimed is:

1. An optical module, comprising:
   an optical sub-assembly;
   a wiring substrate electrically connected to the optical sub-assembly;
   a housing having a front space for enclosing the optical sub-assembly, a rear space for enclosing the wiring substrate, and a stopper provided between the front space and the rear space, the front space and the rear space extending along a hypothetical direction; and
   a holder for holding the wiring substrate, the holder having a resilient portion for pressing the substrate toward the front space,
   wherein the wiring substrate butt against the stopper of the housing.

2. An optical module, according to claim 1, wherein the wiring substrate has a first portion having a first width, a second portion having a second width greater than the first width and a taper connecting the first portion to the second portion, and wherein the resilient portion of the holder presses the taper of the wiring substrate toward the front space.

3. An optical module, according to claim 2, wherein the holder has a base having an opening, the first portion of the wiring substrate being inserted into the opening.

4. An optical module, according to claim 1, wherein the holder has a pair of latch.

5. An optical module, according to claim 4, wherein the housing has a pair of side wall having latches for hooking the latch of the holder.

6. An optical module, according to claim 5, wherein the side wall has a groove extending along the hypothetical direction for guiding the wiring substrate, the groove having a pair of inner wall.

7. An optical module, according to claim 6, wherein the housing further comprises an elastic piece in the groove for pressing the wiring substrate against one of the inner wall of the groove.

8. An optical module, according to claim 6, wherein the housing further comprises an elastic sheet for pressing the wiring substrate against the inner wall of the groove.

9. An optical module, according to claim 1, wherein the optical sub-assembly comprises a first portion having a first diameter for enclosing an optical semiconductor device, a second portion having a second diameter smaller than the first diameter, and a step for connecting the first portion and the second portion, and wherein the housing has an optical receptacle next to the front space along the hypothetical direction, and a partition having a hole piercing from the front space to the optical receptacle, the optical sub-assembly being arranged so that the second portion thereof is inserted in the hole and the step butts against the partition.

10. An optical module, according to claim 1, wherein the optical sub-assembly has a plurality of lead terminals for electrically connecting the sub-assembly to the wiring substrate, wherein the lead terminals is connected to the wiring substrate so as to sandwich the wiring substrate.

11. An optical module, according to claim 10, wherein the lead terminals of the sub-assembly has a resilient characteristic.

12. An optical module, according to claim 1, wherein the optical sub-assembly is a transmitting optical sub-assembly.

13. An optical module, according to claim 1, wherein the optical sub-assembly is a receiving optical sub-assembly.

14. An optical module, according to claim 1, wherein the module includes a transmitting optical sub-assembly and a receiving optical sub-assembly.

15. An optical link module, comprising:

a transmitting optical sub-module;

a receiving optical sub-module;

a wiring substrate electrically connected to the transmitting optical sub-module and the receiving optical sub-module, the wiring substrate having a first portion width a first width, a second portion with a second width greater than the first width and a taper connecting the first portion and the second portion;

a housing comprising an optical receptacle, a body and a connector cover arranged along a hypothetical axis, the body including a front space for enclosing the transmitting optical sub-assembly and the receiving optical sub-assembly, a rear space for enclosing the wiring substrate and a stopper provided between the front space and the rear space, the front space, the rear space and the stopper being arranged along the hypothetical axis; and a holder for holding the wiring substrate, the holder having a resilient portion for pressing the taper of the substrate toward the front space so as to butt against the stopper.

* * * * *